(12) United States Patent
Li

(10) Patent No.: US 10,261,238 B2
(45) Date of Patent: Apr. 16, 2019

(54) BLACKLIGHT SOURCE AND DISPLAY DEVICE

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/326,388

(22) PCT Filed: Jun. 28, 2016

(86) PCT No.: PCT/CN2016/087411
§ 371 (c)(1),
(2) Date: Jan. 13, 2017

(87) PCT Pub. No.: WO2017/067207
PCT Pub. Date: Apr. 27, 2017

(65) Prior Publication Data
US 2018/0217320 A1   Aug. 2, 2018

(30) Foreign Application Priority Data

Oct. 23, 2015   (CN) .......................... 2015 1 0696915

(51) Int. Cl.
*G02F 1/1335*   (2006.01)
*F21V 8/00*   (2006.01)

(52) U.S. Cl.
CPC .......... *G02B 6/0085* (2013.01); *G02B 6/009* (2013.01); *G02B 6/0073* (2013.01);
(Continued)

(58) Field of Classification Search
CPC .......................... G02F 1/133608; G02B 6/009
See application file for complete search history.

(56) References Cited

U.S. PATENT DOCUMENTS

| | | | |
|---|---|---|---|
| 2007/0200969 A1* | 8/2007 | Hsu ...................... | G02B 6/0088 349/58 |
| 2008/0043171 A1 | 2/2008 | Takahashi et al. | |
| 2009/0027919 A1 | 1/2009 | Feng et al. | |

(Continued)

FOREIGN PATENT DOCUMENTS

| | | |
|---|---|---|
| CN | 101126867 A | 2/2008 |
| CN | 101699141 A | 4/2010 |

(Continued)

OTHER PUBLICATIONS

First Office Action for Chinese Application No. 201510696915.5, dated Oct. 10, 2017, 6 Pages.

(Continued)

*Primary Examiner* — Kendrick Hsu
(74) *Attorney, Agent, or Firm* — Brooks Kushman P.C.

(57) ABSTRACT

The present disclosure provides a backlight source and a display device. The backlight source includes a back plate, a light bar and a rubber strip. The back plate is made of a metal material and includes a base, one first side portion and three second side portions, wherein the first side portion and the three second side portions are connected to the base and arranged at four sides of the base respectively. The first side portion includes a parallel part which is parallel to the base and a connection part which connects the parallel part to the base. The light bar is fixed on the parallel part. The rubber strip is fixed on at least one of the second side portions. An upper surface of the rubber strip and a surface of the parallel part form a support surface.

18 Claims, 4 Drawing Sheets

(52) U.S. Cl.
CPC ...... *G02F 1/133608* (2013.01); *G02B 6/0031* (2013.01); *G02B 6/0051* (2013.01); *G02B 6/0053* (2013.01); *G02B 6/0055* (2013.01)

(56) References Cited

U.S. PATENT DOCUMENTS

| | | | |
|---|---|---|---|
| 2010/0002420 A1 | 1/2010 | Shih | |
| 2010/0328580 A1 | 12/2010 | Kim | |
| 2011/0007242 A1* | 1/2011 | Lee | G02F 1/133608 349/65 |
| 2011/0116011 A1 | 5/2011 | Isobe et al. | |
| 2011/0273904 A1* | 11/2011 | Tajiri | F21V 29/004 362/606 |
| 2011/0279748 A1* | 11/2011 | Hasegawa | G02B 6/0093 349/58 |
| 2014/0362327 A1* | 12/2014 | Ohkubo | G02F 1/133308 349/58 |
| 2015/0036383 A1 | 2/2015 | Wu et al. | |
| 2015/0160401 A1* | 6/2015 | Namekata | G02F 1/1336 349/65 |
| 2016/0124140 A1* | 5/2016 | Chen | G02B 6/0073 362/606 |
| 2016/0334561 A1 | 11/2016 | Zeng | |

FOREIGN PATENT DOCUMENTS

| | | |
|---|---|---|
| CN | 201561339 U | 8/2010 |
| CN | 101930137 A | 12/2010 |
| CN | 101950098 A | 1/2011 |
| CN | 102077012 A | 5/2011 |
| CN | 102281138 U | 6/2012 |
| CN | 103032762 A | 4/2013 |
| CN | 203250090 U | 10/2013 |
| CN | 203442723 U | 2/2014 |
| CN | 203823673 U | 9/2014 |
| CN | 203825226 U | 9/2014 |
| CN | 104848088 A | 8/2015 |
| CN | 204629254 U | 9/2015 |
| CN | 105223732 A | 1/2016 |
| KR | 20110074316 A | 6/2011 |
| KR | 20110093056 A | 8/2011 |

OTHER PUBLICATIONS

International Search Report and Written Opinion for Application No. PCT/CN2016/087411, dated Sep. 26, 2016, 10 Pages.

* cited by examiner

BLACKLIGHT SOURCE AND DISPLAY DEVICE

CROSS REFERENCE TO RELATED APPLICATIONS

This application is the U.S. national phase of PCT Application No. PCT/CN2016/087411 filed on Jun. 28, 2016, which claims priority to Chinese Patent Application No. 201510696915.5 filed on Oct. 23, 2015, the disclosures of which are incorporated in their entirety by reference herein.

TECHNICAL FIELD

The present disclosure relates to the field of display technology, in particular to a backlight source and a display device.

BACKGROUND

A display device with high brightness and a maximum visible area has become an important development direction of the display device. Usually, to achieve the high brightness for a liquid display device, luminance of the backlight source needs to be increased. Generally, the increase in luminance of the backlight source depends on an increase in the number of light sources (e.g. LEDs). Nevertheless, the increase in the number of the light sources would inevitably cause an increase in heat generated by the light sources, which requires that the backlight source has a structure with a good heat dissipating capability. In a structure of the backlight source in a related art, components such as a light guide plate and a reflecting layer may be deformed irreversibly because of the heat, resulting in damage to the backlight source.

SUMMARY

An object of the present disclosure is to solve at least one technical problem existing in a related art and to provide a backlight source and a display device, which can improve the heat-dissipation efficiency inside the backlight source and prevent an internal component of the backlight source from being damaged by high temperature.

To achieve the object of the present disclosure, the present disclosure provides a backlight source including a back plate, a light bar and a rubber strip. The back plate is made of a metal material and comprises a base, one first side portion and three second side portions, and the first side portion and the three second side portions are connected to the base and arranged at four sides of the base respectively. The first side portion comprises a parallel part which is parallel to the base and a connection part which connects the parallel part to the base. The light bar is fixed on the parallel part. The rubber strip is fixed on at least one of the second side portions. An upper surface of the rubber strip and a surface of the parallel part form a support surface.

Optionally, the rubber strip is fixed on the second side portion opposite to the first side portion.

Optionally, the rubber strip is fixed on one or two second side portions adjacent to the first side portion.

Optionally, the rubber strips are respectively fixed on a second side portion opposite to the first side portion and one or two second side portions adjacent to the first side portion, respectively.

Optionally, the light bar and the rubber strip are provided with light-shielding tapes.

Optionally, each light-shielding tape is provided with a protective film.

Optionally, surfaces of the second side portions are provided with black plating films.

Optionally, a width of the rubber strip ranges from 0.2 mm to 0.5 mm.

Optionally, a length of the parallel part ranges from 1.3 mm to 2.0 mm.

Optionally, the light bar is bonded and fixed to the parallel part through a double-sided tape.

Optionally, a surface of the back plate which is in contact with the light bar is plated with copper.

Optionally, the parallel part is provided with a groove for receiving a light source of the light bar.

Optionally, the parallel part is provided with a plurality of grooves and each groove is adapted to receive one light source.

Optionally, an angle between the parallel part and the connection part is 90 degrees; and an angle between the connection part and the base is 90 degrees.

Optionally, an angle between the base and each second side portion is 90 degrees.

Further, the backlight source also includes a light guide plate and an optical film which are arranged on the base of the back plate, wherein the optical film includes a diffusion plate and a prism film, and the light guide plate, the diffusion plate and the prism film are arranged in sequence in a direction away from the base of the back plate.

Optionally, the optical film further includes a reflecting layer that is arranged between the light guide plate and the base of the back plate.

In some embodiments, the present disclosure further provides a display device including the above-mentioned backlight source.

The present disclosure has following advantageous effects.

The backlight source provided by the present disclosure has a light bar provided on a parallel part of the back plate which is made of a metal material. When the backlight source operates, heat generated by the light source is dissipated by transferring the heat through the back plate, and thus the backlight source has a high heat-dissipation efficiency. When the operation of the backlight source continues for a long time, the heat generated by the light source may be quickly radiated to the outside without heat accumulation. As a result, the temperature inside the backlight source can remain relatively low, and internal components of the backlight source, such as the light guide plate, the reflecting layer, etc, can be prevented from being damaged by high temperature.

BRIEF DESCRIPTION OF THE DRAWINGS

The accompanying drawings are used to provide a further understanding of the disclosure, and are incorporated into and constitute a part of this specification. The drawings, together with the embodiments, are used only to explain but not to limit the present disclosure.

Figure 1:
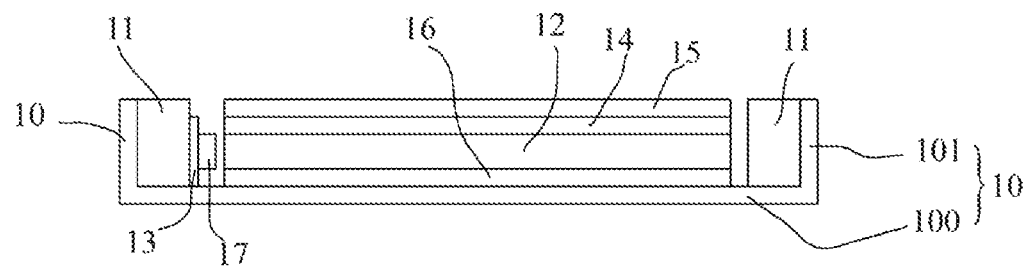
FIG. 1 is a schematic diagram showing a structure of a backlight source.

Reference numerals: 10: back plate; 11: rubber frame; 12: light guide plate; 13: light bar; 14: diffusion plate; 15: prism film; 16: reflecting layer; 17: light source; 18: light-shielding tape; 19: protective film of the light-shielding tape; 20: rubber strip; 100: base; 101: side portion; 102: parallel part; 103: connection part.

DETAILED DESCRIPTION

Detailed description of the present disclosure is set forth hereinafter with reference to the drawings and embodiments. It should be understood that the described embodiments herein are used only to explain but not to limit the present disclosure.

FIG. 1 is a schematic diagram showing a structure of a backlight source. As shown in FIG. 1, the backlight source includes a back plate 10, a rubber frame 11, a light guide plate 12, an optical film and a light bar 13. The back plate 10 includes a base 100 and four side portions 101 which are connected to the base 100 and arranged at four sides of the base 100 respectively. The base 100 and the side portions 101 form a cavity. The base 100 and the side portions 101 are made of a metal material such as iron. The rubber frame 11 that is fixed on the back plate 10 is arranged around the inner wall of the cavity. The rubber frame 11 and the back plate 10 form a rubber-iron integrated structure. The light guide plate 12 is located in the cavity. The optical film includes a diffusion plate 14, a prism film 15 and a reflecting layer 16, etc. The diffusion plate 14 and the prism film 15 located above the light guide plate 12 are arranged in sequence in a direction away from the light guide plate 12, and the reflecting layer 16 is located below the light guide plate 12. The light bar 13 includes a plurality of light sources 17 connected together. The light sources may be light-emitting diodes (LEDs). The light bar 13 is fixed on the rubber frame 11 and is located at a position facing a light incident side of the light guide plate 12. Light emitted from the light sources 17 enters into the light guide plate 12 from the light incident side of the light guide plate 12.

In the above structure of the backlight source, since the light bar 13 is fixed on the rubber frame 11, heat generated from the light sources 17 is transferred to the rubber frame 11 and then is dissipated to the outside. However, it is known that the heat dissipating capability of the rubber frame 11 is poor, so the heat generated from the light sources 17 is continuously accumulated. As a result, the temperature inside the backlight source is continually increased. When the temperature inside the backlight source reaches a certain temperature (e.g. 55 degrees Celsius), the light guide plate 12 and the reflecting layer 16 that are closer to the light sources 17 may be deformed irreversibly because of the heat, resulting in damage to the backlight source.

To solve the above problems, the present disclosure provides in an embodiment a backlight source. Referring to FIGS. 2 to 7, in the embodiment, the backlight source includes a back plate 10, a light bar 13 and a rubber strip 20. The back plate 10 is made of a metal material (e.g., iron, etc.) and includes a base 100, one first side portion and three second side portions 101, which are connected to the base 100 and arranged at four sides of the base 100 respectively.

The first side portion includes a parallel part 102 which is substantially parallel to the base 100 and a connection part 103 which connects the parallel part 102 to the base 100. The light bar 13 is fixed on the parallel part 102. Specifically, a length L2 of the parallel part 102 ranges from 1.3 mm to 2.0 mm.

At least one of the second side portions 101 has a rubber strip 20 fixed thereon. An upper surface of the rubber strip 20 and a surface of the parallel part 102 form a support surface used to support other structures of the backlight source.

The backlight source also includes a light guide plate 12 and an optical film that includes a diffusion plate 14, a prism film 15 and a reflecting layer 16. The light guide plate 12 and the optical film are arranged on the base 100 of the back plate 10; the light guide plate 12, the diffusion plate 14 and the prism film 15 are arranged in sequence in a direction away from the base 100 of the back plate 10; and the reflecting layer 16 is arranged between the light guide plate 12 and the base 100 of the back plate 10.

In the embodiment, an angle between the base 100 and each second side portion 101 is approximately 90 degrees, an angle between the parallel part 102 and the connection part 103 is 90 degrees, and an angle between the base 100 and the connection part 103 is 90 degrees, so that the parallel part 102 is parallel to the base 100, and a surface of the parallel part 102 serves as a support surface. Optionally, the angle between the connection part 103 and the base 100 and the angle between the parallel part 102 and the connection part 103 may be not limited to 90 degrees but may be any other degrees as long as that the surface of the parallel part 102 can serve as the support surface.

In an embodiment, edges of the back plate 10 are folded to form the first side portion and the second side portions. An edge of the back plate 10 may be folded twice to form the first side portion. The connection part 103 is formed after the back plate 10 is folded for a first time, and the parallel part 102 is formed after the back plate is folded for a second time. Other edge(s) of the back plate 10 may be folded once to form the second side portion 101. In another embodiment, the first side portion, the second side portions and the back plate may be molded at one time by using a die.

Figure 2:
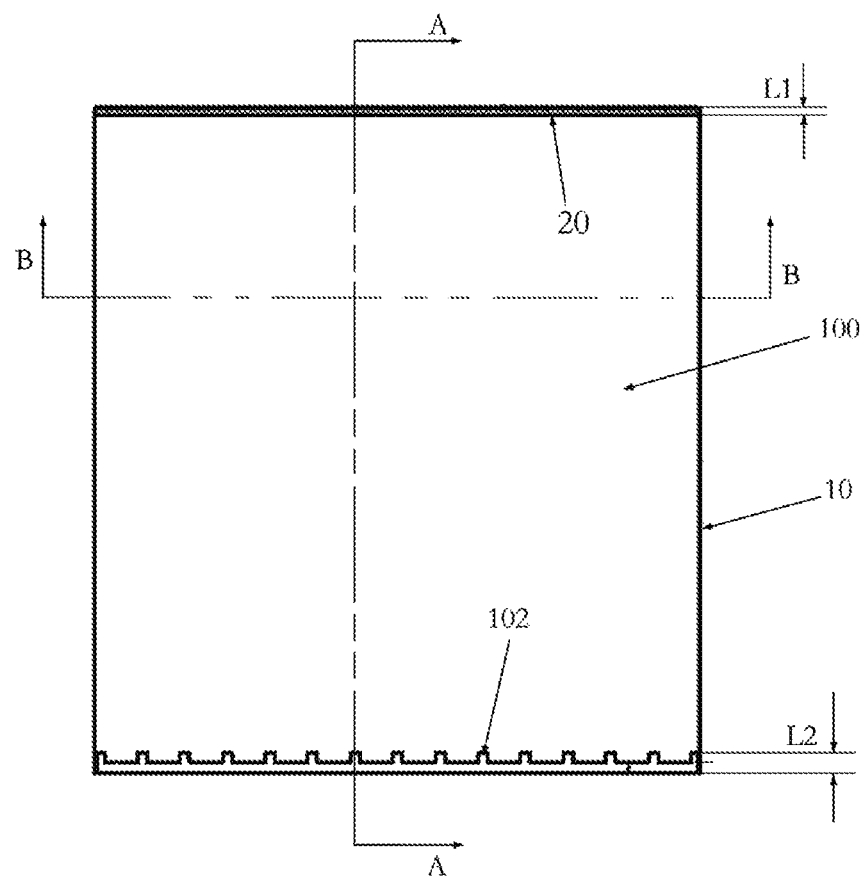
FIG. 2 is a plan view showing a structure of a backlight source in an embodiment of the present disclosure.
Figure 3:
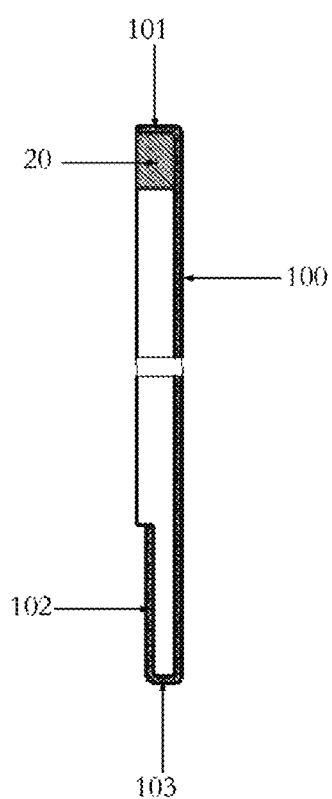
FIG. 3 is a sectional view showing the backlight source taken along line A-A in FIG. 2 (a light bar, a light guide plate, an optical film, etc. are not shown)
Figure 4:
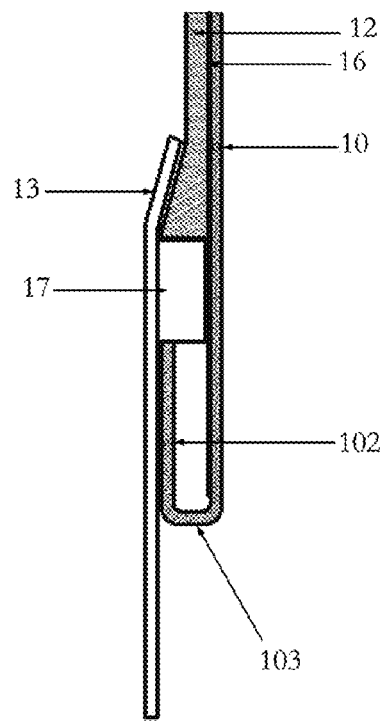
FIG. 4 is a schematic diagram showing the backlight source in FIG. 3 a lower end of which has structures, such as a light bar and a light guide plate, mounted thereon.
Figure 5:
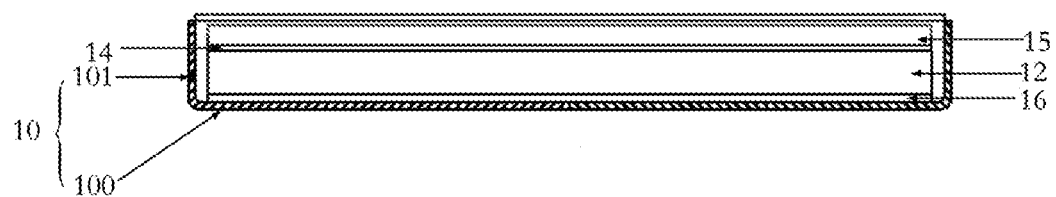
FIG. 5 is a sectional view showing the backlight source taken along line B-B in FIG. 2.
Figure 6:
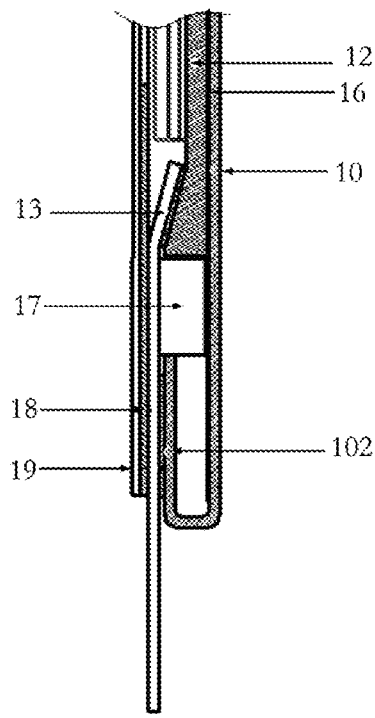
FIG. 6 is a schematic diagram showing a light incident side of a backlight source.
Figure 7:
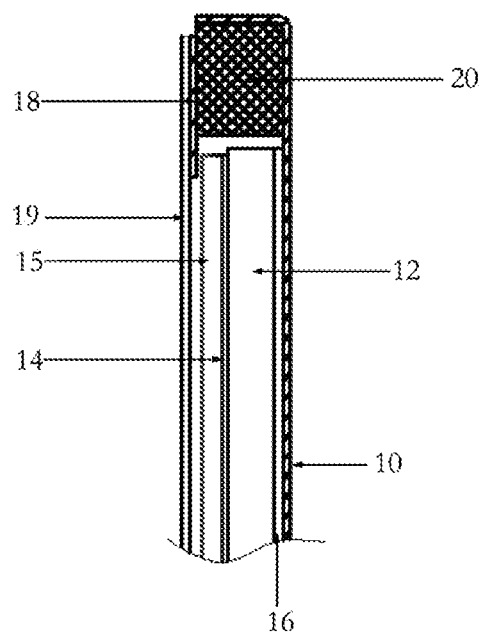
FIG. 7 is a schematic diagram showing a light emitting side of a backlight source.

The rubber strip 20 may be prepared on each second side portion through a mould-injection process, so that the rubber strip 20 and the back plate 10 may form a rubber-iron integrated structure, as shown FIG. 3. Comparing with a traditional structure where the rubber frame 11 is separated from the back plate 10, the rubber-iron integrated structure may enhance structural strengthness of the backlight source. At the same time, the backlight source is easily assembled. Specifically, as shown in FIG. 2, a width L1 of the rubber strip 20 ranges from 0.2 mm to 0.5 mm.

In some embodiments, the light bar 13 includes a flexible printed circuit (FPC) and a light source 17 arranged on the FPC. The light source may be LED.

In some embodiments, the light bar 13 that may be FPC is bonded and fixed on the surface of the parallel part 102 through a double-sided tape.

In some embodiments, as shown in FIG. 2, the parallel part 102 may be provided with a groove for receiving a light source, thereby improving stability of the light source 17 and facilitating assembly between the light bar 13 and the back plate 10.

In some embodiments, the parallel part 102 is provided with a plurality of grooves which are equally spaced and have the same depth, i.e., a front end of the parallel part 102 forms a great wall-like structure, as shown is FIG. 2. Each groove is adapted to receive one light source 17. Thus, the stability of the light source 17 can be further improved.

In the embodiment, the light bar 13 is arranged on the parallel part 102 of the back plate 10. In this way, when the backlight source operates, heat generated by the light source is transferred to the parallel part 102 and is dissipated to the outside. Since the back plate 10 is made of a metal material, a higher heat-dissipation efficiency is achieved. Hence, when the operation of the backlight source continues for a long time, the heat generated by the light source 17 may be quickly radiated to the outside without heat accumulation. As a result, the temperature inside the backlight source can remain relatively low, and internal components of the backlight source, such as the light guide plate, the reflecting layer, etc, can be prevented from being damaged by high temperature.

Further, a surface of the back plate 10 which is in contact with the light bar 13 is plated with copper. Certainly, all of the surface of the back plate 10 can be plated with copper. The copper has a higher heat-dissipation efficiency compared to the iron. The heat generated by the light source 17 may be transferred to the back plate 10 more quickly, thereby further speeding up the heat dissipation and obtaining a sufficient heat-dissipation effect.

Since the parallel part 102 has a surface that is able to provide support, a side of the base 100 at which the first side portion is arranged may not need to be provided with the rubber strip 20 for the support. In the embodiment, the rubber strip 20 only needs to be provided on other side(s) of the base 100. Compared to the related art, with a simplified rubber-iron integrated structure, it is possible to make the structure of the backlight source simpler.

In some embodiments, the rubber strip 20 may be only fixed on the second side portion 101 opposite to the first side portion. That is to say, in the backlight source, only one side portion opposite to the first side portion is provided with the rubber strip 20, while no rubber strip is provided on two side portions adjacent to the first side portion. Thus, the number of the rubber strips 20 can be further reduced, and the rubber-iron integrated structure can be simplified. At the same time, a support surface, which is formed by the surface of the parallel part 102 and the rubber strip 20 at the opposite side of the parallel part 102, also can steadily support other structure(s) of the backlight source. Since the surface of the parallel part 102 is covered with the light bar 13, the surface of the parallel part 102 here actually is the surface of the light bar 13 that covers the parallel part 102. Further, no rubber strip 20 is provided on two sides adjacent to the parallel part 102, a width of a side frame can be reduced, and a light output area of the backlight source can be increased, thereby contributing to an increase in the proportion of the visual area in the display device.

In some embodiments, each of these three second side portions 101 is provided with the rubber strip 20. A support surface, which is formed by the surface of the parallel part 102 (or the surface of the light bar 13 that covers the parallel part 102) and the adjacent rubber strips 20, can steadily support other structure(s) of the backlight source.

In some embodiments, the rubber strip is only fixed on one or two second side portions 101 adjacent to the first side portion 101. A support surface, which is formed by the surface of the parallel part 102 (or the surface of the light bar 13 that covers the parallel part 102) and the adjacent rubber strip(s) 20, can steadily support other structure(s) of the backlight source.

In some embodiments, the light bar 13 and the rubber strip 20 are provided with light-shielding tapes 18 for blocking light, so as to prevent the light from being output from a side of an optical film to the outside. A protective film 19, used to protect the light-shielding tape 18, is arranged on the light-shielding tape 18. It is no need to provide the light-shielding tape 18 on a position where no rubber strip 20 is fixed. Thus, the width of the side frame can be further reduced, thereby increasing the light output area of the backlight source.

In some embodiments, the rubber strip 20 is fixed on only one or two second side portions 101. The light may be emitted from the side of the optical film and radiated on the second side portion 101 at a side on which no rubber strip is provided, and the light reflected from the second side portion 101 forms a bright line which affects the display quality. To overcome the problem, in these embodiments, all the second side portions may be treated by a black plating process, or only the second side portion(s) 101 on which no the rubber strip 20 is fixed is treated by the black plating process, so that the surface of the second side portion 101 after the treatment of the black plating process has a black plating film provided thereon, to prevent the light from being output from a side of the optical film.

In conclusion, the backlight source provided by the present disclosure has the light bar 13 provided on the parallel part 102 of the back plate 10 which is made of a metal material. When the backlight source operates, the heat generated by the light source 17 is dissipated by transferring the heat through the back plate 10, and thus the backlight source has the higher heat-dissipation efficiency. When the operation of the backlight source continues for a long time, the heat generated by the light source 17 may be quickly radiated to the outside without heat accumulation. As a result, the temperature inside the backlight source can remain relatively low, and internal components of the backlight source, such as the light guide plate, the reflecting layer, etc, can be prevented from being damaged by high temperature.

The present disclosure also provides an embodiment of the display device. In the embodiment, the display device includes the backlight source according to the above embodiments.

The display device provided by the present disclosure that uses the backlight source according to the above embodiments can has the higher heat-dissipation efficiency, so that the internal components of the backlight source can be prevented from being damaged by the high temperature.

It should be understood that the above embodiments are merely used to illustrate the principles of the present disclosure and shall not be used to limit the scope of the present disclosure. A person skilled in the art may make improvements and modifications without departing from the principle of the present disclosure, and these improvements and modifications shall also fall within the scope of the present disclosure.

What is claimed is:

1. A backlight source, comprising a back plate, a light bar and a plurality of rubber strips; wherein:

the back plate is made of a metal material and comprises a base, one first side portion and three second side portions, wherein the first side portion and the three second side portions are connected to the base and arranged at four sides of the base respectively, and the first side portion comprises a parallel part which is parallel to the base and a connection part which connects the parallel part to the base;

the light bar is fixed on the parallel part;

the plurality of rubber strips is fixed on a second side portion opposite to the first side portion and one or two second side portions adjacent to the first side portion, respectively; and an upper surface of each rubber strip and a surface of the parallel part form a support surface.

2. The backlight source according to claim 1, wherein the light bar and each rubber strip are provided with light-shielding tapes.

3. The backlight source according to claim 2, wherein each light-shielding tape is provided with a protective film.

4. The backlight source according to claim 1, wherein surfaces of the second side portions are provided with black plating films.

5. The backlight source according to claim 1, wherein a surface of the second side portion on which no rubber strip is fixed is provided with a black plating film.

6. The backlight source according to claim 1, wherein a width of each rubber strip ranges from 0.2 mm to 0.5 mm.

7. The backlight source according to claim 1, wherein a length of the parallel part ranges from 1.3 mm to 2.0 mm.

8. The backlight source according to claim 1, wherein the light bar is bonded and fixed to the parallel part through a double-sided tape.

9. The backlight source according to claim 8, wherein a surface of the back plate which is in contact with the light bar is plated with copper.

10. The backlight source according to claim 8, wherein the parallel part is provided with a groove for receiving a light source of the light bar.

11. The backlight source according to claim 10, wherein the parallel part is provided with a plurality of grooves and each groove is adapted to receive one light source.

12. The backlight source according to claim 1, wherein a surface of the back plate which is in contact with the light bar is plated with copper.

13. The backlight source according to claim 1, wherein an angle between the parallel part and the connection part is 90 degrees; and an angle between the connection part and the base is 90 degrees.

14. The backlight source according to claim 1, wherein an angle between the base and each second side portion is 90 degrees.

15. The backlight source according to claim 1, further comprising a light guide plate and an optical film which are arranged on the base of the back plate, wherein the optical film comprises a diffusion plate and a prism film, and the light guide plate, the diffusion plate and the prism film are arranged in sequence in a direction away from the base of the back plate.

16. The backlight source according to claim 15, wherein the optical film further comprises a reflecting layer that is arranged between the light guide plate and the base of the back plate.

17. A display device, comprising the backlight source according to claim 1.

18. A backlight source comprising a back plate, a light bar and a rubber strip; wherein:

the back plate is made of a metal material and comprises a base, one first side portion and three second side portions, the first side portion and the three second side portions are connected to the base and arranged at four sides of the base respectively, and the first side portion comprises a parallel part which is parallel to the base and a connection part which connects the parallel part to the base;

the light bar is fixed on the parallel part;

the rubber strip is fixed on at least one of the second side portions;

an upper surface of the rubber strip and a surface of the parallel part form a support surface; and the light bar is bonded and fixed to the parallel part through a double-sided tape, the parallel part is provided with a plurality of grooves and each groove is configured to receive one light source of the light bar.

* * * * *